United States Patent [19]

Markham

[11] 4,092,577
[45] May 30, 1978

[54] DYNAMIC BRAKING OF DIRECT CURRENT MOTORS

[75] Inventor: John David Markham, Manchester, England

[73] Assignee: Associated Electrical Industries Limited, London, England

[21] Appl. No.: 769,054

[22] Filed: Feb. 16, 1977

[30] Foreign Application Priority Data

Feb. 19, 1976 United Kingdom ............... 6665/76

[51] Int. Cl.² ............................................. H02P 3/12
[52] U.S. Cl. ................................. 318/370; 318/377; 318/381
[58] Field of Search ............... 318/370, 373, 377, 378, 318/381, 371

[56] References Cited

U.S. PATENT DOCUMENTS

| | | | |
|---|---|---|---|
| 3,525,027 | 8/1970 | Weiser | 318/377 X |
| 3,532,951 | 10/1970 | Hovance | 318/373 X |
| 3,555,385 | 1/1971 | Risberg | 318/373 X |
| 3,866,098 | 2/1975 | Weiser | 318/381 X |

Primary Examiner—Robert K. Schaefer
Assistant Examiner—W. E. Duncanson, Jr.
Attorney, Agent, or Firm—Kirschstein, Kirschstein, Ottinger, Frank & Cobrin

[57] ABSTRACT

A braking system for, primarily, separately excited D.C. traction motors, in which rheostatic braking is effected by field reversal to generate armature current freewheeling through the low impedance supply and through a brake resistor in series with the armature. A contactor shorts out the brake resistor for normal motoring. Field excitation in conjunction with armature current or armature voltage polarity reversal is detected to indicate the motor generating function, lock open the motoring contactor and prevent short circuiting of the motor/generator. Plug braking by energisation of the armature supply is thus always permissible either by brake handle and power handle or reverse handle and power handle. The armature current then contains a rheostatic braking component and a tractor braking component. What would normally be mis-use of the reversing control to achieve rapid deceleration thus becomes acceptable.

9 Claims, 3 Drawing Figures

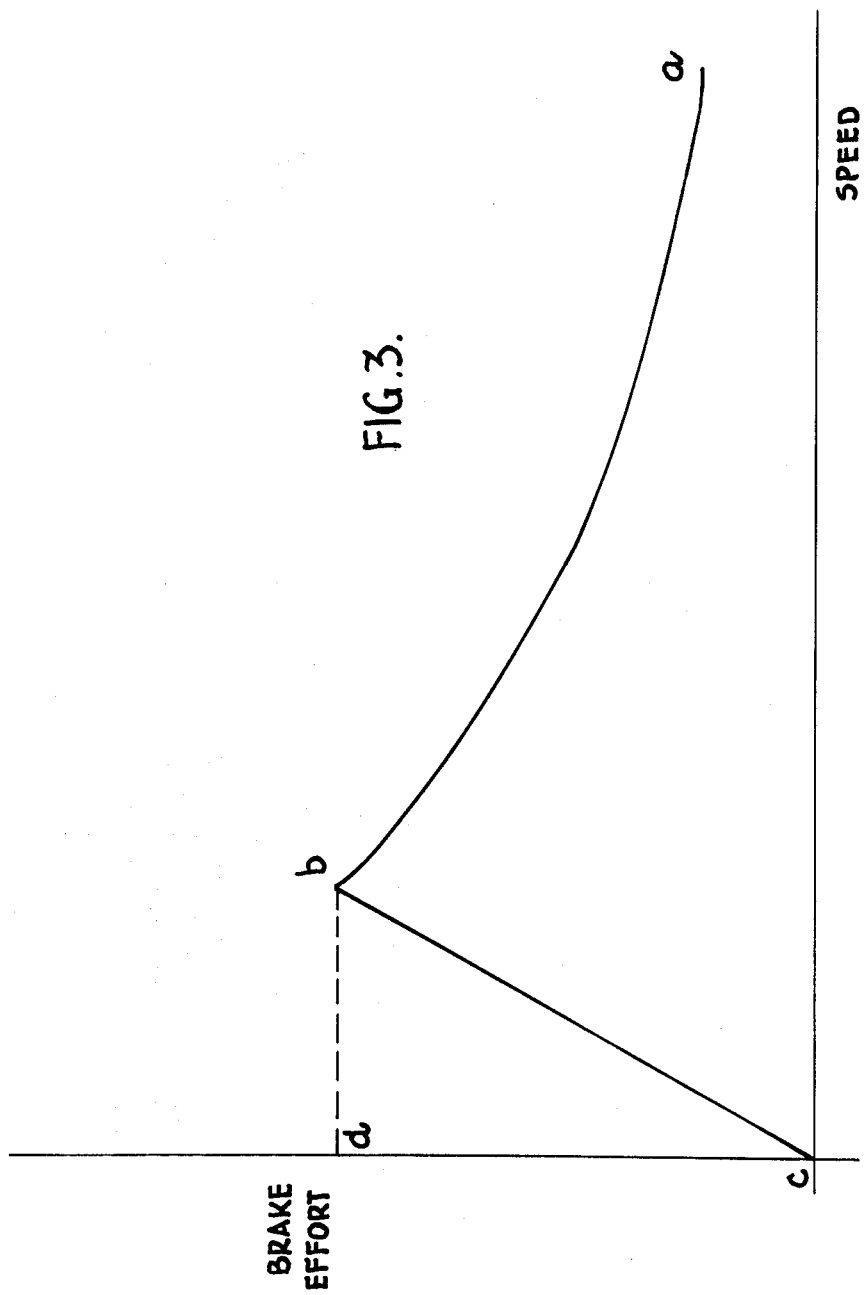

DYNAMIC BRAKING OF DIRECT CURRENT MOTORS

This invention relates to dynamic braking of direct current (D.C.) electric motors and particularly to the dynamic braking of D.C. traction motors.

Rheostatic braking is commonly used on railway locomotives powered by diesel engine, direct current or alternating current (A.C.) supply systems. In such systems using separately excited motors the motor armature is switched from the power supply to a braking or load resistor, in a braking operation, to dissipate energy generated by the motor by virtue of the inertia of the locomotive after the driving power has been switched off.

FIG. 1 of the accompanying drawings shows, diagrammatically, such a known motor braking circuit. Two asymmetric thyristor bridge circuits 1 (i.e. having two controlled arms and two uncontrolled arms) have their A.C. terminals connected to the secondary windings of a transformer and their D.C. paths connected in series with the armature 2 of the motor. The series circuit is closed by a motor contactor MC. Connected across the armature is a braking or load resistor 3 in series with a brake contractor BC.

In normal motoring operation, the motor contactor MC is closed, the brake contactor BC is open and the armature voltage is controlled by phase control of the firing angle of the thyristors in the bridges 1 in known manner. Each pair of series arms of a bridge 1 comprises a thyristor arm and a diode arm so that there is an uncontrolled low impedance path through the bridges 1, which bypasses the A.C. circuit. This feature is not of significance in this prior art arrangement but it is essential to the present invention.

The field winding F is connected by a reversing switch 4 and a field contactor FC to a further controllable D.C. source. A voltage limiting device is connected across the field winding.

In one mode of braking operation, the driving power is reduced to zero by means of thyristor bridges 1, the field excitation reduced to zero, the motor contactor MC opened and the brake contactor BC closed. Re-application of the field excitation causes current generation, dissipation of energy in the brake resistor and consequent braking of the motor.

A further braking effect could be obtained if the generated armature current could be boosted during braking. This is not permissible in the circuit of FIG. 1, since, if the motor contact MC is closed to feed current from the supply to the armature, the low impedance path through the bridge circuits would short circuit the motor in its generator function. Nevertheless, it has been known for attempts to be made to brake in this way by turning off the 'power' to the armature, operating the reversing handle contrary to the direction of motion and then turning on the 'power.' Damage to the motor is very probable in such circumstances.

It is an object of the present invention to provide a braking arrangement for a D.C. motor which will permit braking by current injection from any operating condition of the motor.

According to the present invention, a dynamic braking system for a D.C. motor, includes a unidirectional series circuit comprising the armature of a D.C. motor, a first controllable D.C. power source providing a permanent low-impedance path, and a brake resistor, and further includes switch means for short-circuiting the brake resistor prior to a motoring operation, a field winding arranged to be connected to a second controllable D.C. source at least in a braking mode, reversing means for reversing the relative direction of current flow in said armature and said field winding, control means for limiting operation of said reversing means to a condition of zero power output from said first D.C. power source, and means for detecting the presence of armature current when said field winding is energised following operation of said reversing means, said control means being arranged to prevent closure of said switch means and consequent short circuiting of the motor, when said means for detecting armature current is activated.

The means for detecting armature current may comprise a current detection device, or may comprise means responsive to the polarity of the armature voltage, said polarity being dependent, in the absence of power from said first D.C. power source, upon the direction of field excitation in relation to the direction of armature rotation if any.

The first D.C. power source perferably comprises a controlled rectifier bridge circuit including uncontrolled rectifying elements providing a permanent low-impedance unidirectional path through the D.C. power source.

The motor armature and the brake resistor may be connected in parallel with one or more further similar arms, each comprising a motor armature and a load resistor and each arm further comprising a rectifying element to prevent current circulating between the arms.

The system preferably includes an earth fault protection device between an earth terminal and the armature terminals remote from the respective brake resistors, said rectifying element being connected in each arm between the protection device and the armature and the arrangement being such that in a braking operation the rectifying elements are forward biased to prevent isolation of the armatures from the protection device.

A rheostatic and current injection braking arrangement for a separately excited D.C. motor will now be described, by way of example, with reference to the accompanying drawings, of which:

FIG. 3 is a graph of braking effort against speed for the arrangement of FIG. 2.

Figure 1:
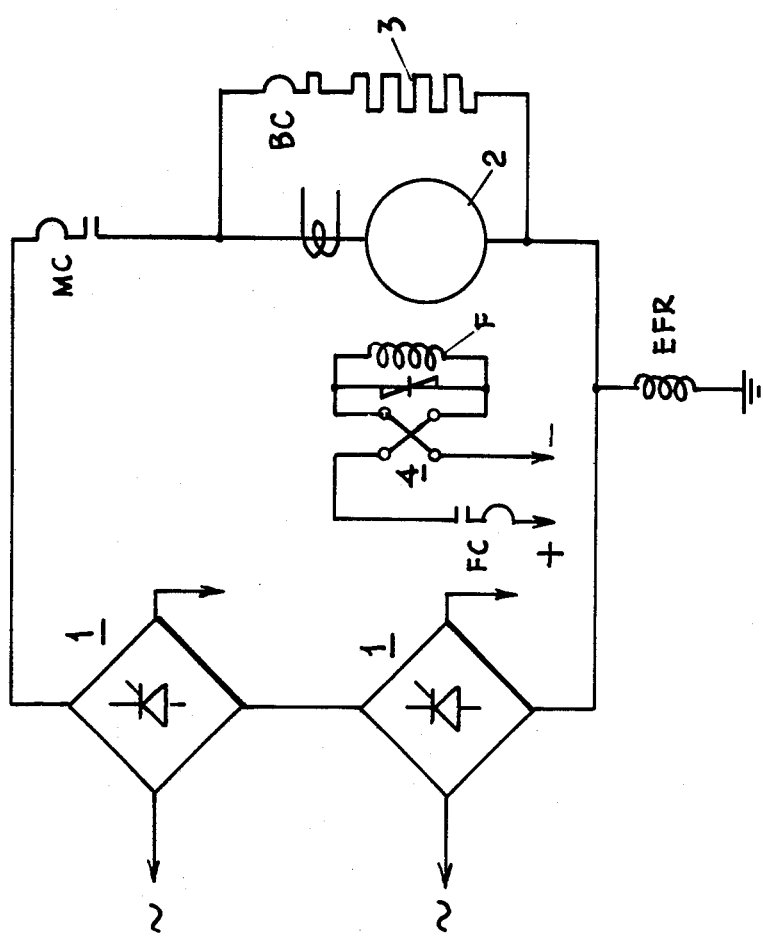
FIG. 1 is a diagrammatic circuit of a known braking arrangement employing rheostatic braking.
Figure 2:
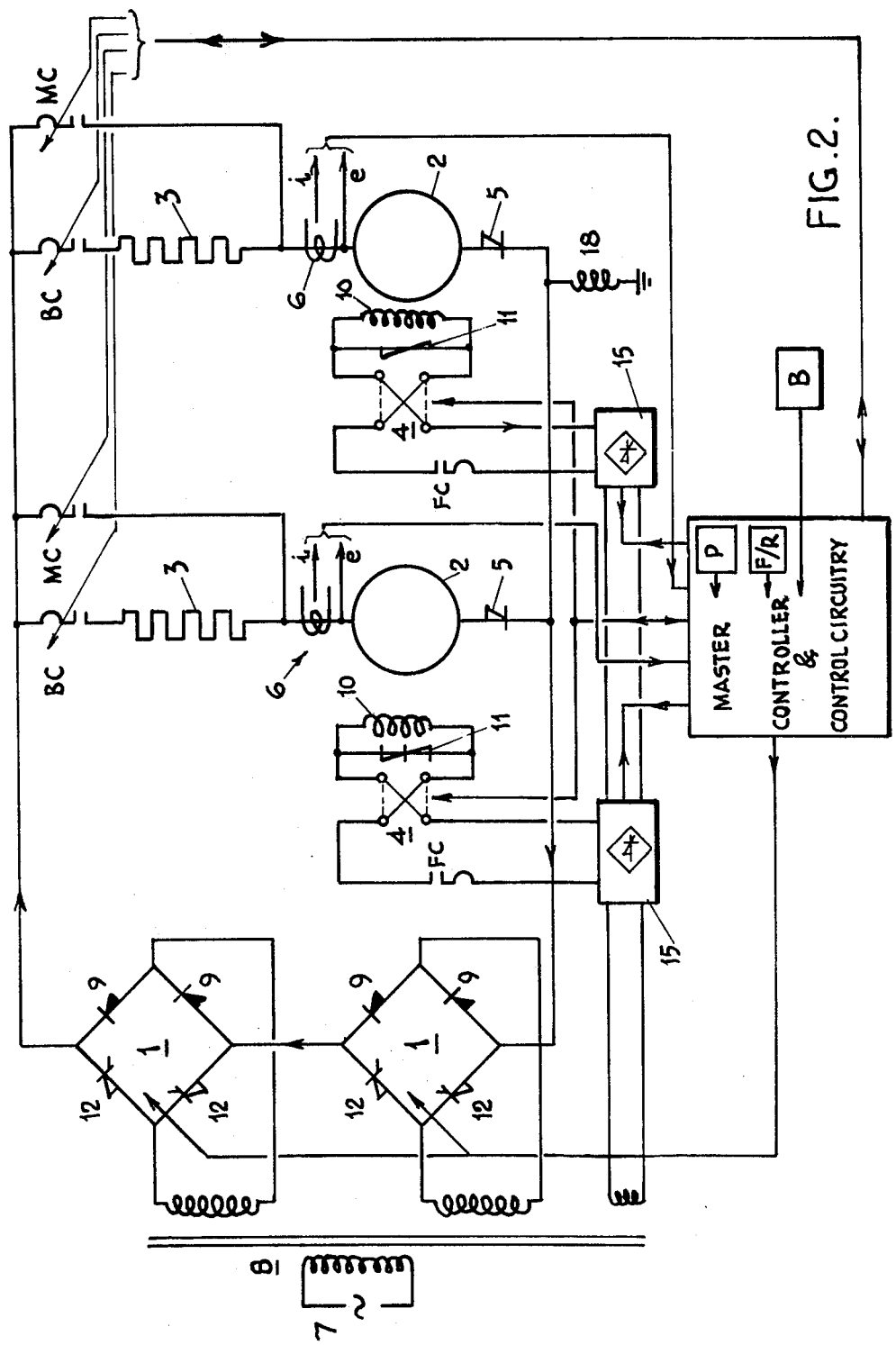
FIG. 2 is a circuit diagram of a rheostatic and current injection braking arrangement for two motors supplied in parallel.

Referring to FIG. 2 of the drawings, the armature currents for the two motors are derived from an A.C. source 7 by way of a transformer 8 and two asymmetric thyristor bridges comprising diodes 9 and thyristors 12, connected with their D.C. paths in series. Each motor armature 2 is connected in series with these D.C. power sources and with its own load or brake resistor 3. Each of these series circuits is closed by a brake contactor BC, the brake contactor and brake resistor 3 having a motor contactor MC connected across them to short-circuit them for normal motoring operation.

To take account of any imbalance between the generating functions of the two motors, diodes 5 are connected one in series with each armature. Circulating currents between the motors are thus prevented.

A current monitoring device represented by a coil 6 is coupled to each armature current path. Only one direction of current can of course occur in each of these paths since the thyristor bridges 1 are unidirectional (and, where there are two or more such paths they each have a diode rectifier 5.) The bridges 1 do, however, have uncontrolled paths through them provided by the diode 9 arms, which permit forward current to 'freewheel' around the circuit in suitable circumstances.

The field windings 10 are connected by reversing switches 4 and field contactors FC to controllable D.C. sources 15 comprising phase-controlled thyristor bridges fed from a further windong on the transformer 8.

The field windings 10 of the two motors are, in this example, separately excited, although in other cases according to the invention the fields could be series connected for motoring and switched to separate excitation for braking. Voltage limiting devices 11 are connected across the field windings.

The controls available to the driver may be selected from a number of different conventional possibilities. For convenience of description it will be assumed that he has a forward/reverse handle (F/R) having OFF, FORWARD and REVERSE positions; a power handle (P) having an OFF position and a series of positions designating increasing armature currents; a brake handle (B) having an OFF position and a range of ON positions designating increasing field excitation. The power handle and the forward/reverse handle are incorporated in a master controller which incorporates logic and control circuitry. The brake handle may be physically separate but is also electrically associated with the control circuitry.

There is a mechanical interlock between the reverse handle and the powerhandle to prevent operation of the reverse handle with the power in 'on'. In addition, there are electrical interlocks between the several handles and the devices which they control effected by the master controller which checks and approves actions indicated by the control handles before putting them into effect. The master controller also effects the various switch and contactor operations after confirming that the conditions are appropriate.

In a normal motoring situation in conditions of zero power, when, say, the locomotive is coasting along or is stationary, the power handle will be at 'off' and the reverse handle may be at 'off' or set in the direction of motion. In this condition all of the contactors MC, BC and FC are open. If now, the driver requires to accelerate, he first moves the reverse handle to the direction of (intended) motion if not already in that position. This movement is held off from operating the reversing switch 4 by the power handle. He then moves the power handle away from the 'off' position which allows the controller to set the reversing switch 4 to correspond with the reverse handle position. Correspondence between the reverse handle position and the reversing switch connections is proved by the controller, following which it effects closure of braking contactor BC. Closure of the braking contactor is proved by the controller, which then closes the field contactor FC.

In the particular arrangement being described it is assumed that the field excitation is controlled by feedback from the armature current in a loop tending to maintain the armature voltage and thus the armature current constant. Armature current is presently zero because the master controller has not yet 'unblocked,' i.e. advanced the firing angle, of the thyristor bridges 1.

The armature current detector 6 therefore causes the feedback loop to increase the field excitation by phase-control of the bridges 15. Since the direction of field excitation corresponds to the direction in which the reverse handle is set, the generated armature voltage as detected at 'e' in FIG. 2 will be either zero or have a polarity corresponding to a normal motoring back e.m.f. (according to whether the locomotive is stationary or coasting in the required direction). This generated e.m.f. is in a direction contrary to the conduction direction through the bridges 1 and therefore no armature current is generated.

These conditions, i.e. $I_f$ maximum, $I_a$ zero, $V_a$ zero or 'normal' polarity, and power handle 'on,' as presented to the master controller, cause the motor contactors MC to close and the bridge 1 firing angles to be advanced to an extent corresponding to the setting of the power handle. Motoring then proceeds under power.

When braking is required, this will normally be carried out by means of the brake handle although, as will be explained, it may alternatively be effected by what is conventionally known as 'illegal plugging' with the great difference that the present invention permits such plugging quite safely and properly. Normally however, when it is desired to brake, the power handle is turned to 'off.' This will cause the contactors MC, BC and FC to drop out. Operation of the brake handle then locks out the motor contactor MC, and automatically sets the reversing switch 4 to the opposite condition to that indicated by the reverse handle. This contrary condition is proved by the master controller which then closes the brake contactor BC. Proof of this condition closes the field contactor and applies excitation.

The armature voltage is now a generated e.m.f. in the same direction as the normal motoring current. A current therefore flows around the series circuit comprising the armature, the thyristor bridges 1 (a path being provided by the diodes 9) and the brake resistor 3, the energy dissipated in the resistor being drawn from the mechanical inertia of the train and thus braking the motor. During this part of the operation the field excitation is being increased by the feedback loop to tend to maintain a constant armature current even as the armature speed is decreasing. This is illustrated by the portion *a* to *b* of FIG. 3.

In this rheostatic braking condition the existence of armature current as detected by the detector 6, at the same time as the power handle is at 'off,' means that the field direction is contrary to the direction of travel. This must be so since only then is the generated e.m.f. in the same direction as the uni-directional path (through the diodes 9) carrying the armature current. The detection of current by the detector 6 confirms the instructions to lock open contactor MC and lock closed contactor BC. The existence of an armature voltage (as detected at 'e') of contrary polarity from the normal motoring back e.m.f. polarity is an additional or alternative indication of a reversed field.

It may be noted that the armature voltage polarity, in the absence of a supply from the bridges 1, is an absolute test for a field contrary to the direction of motion since normal armature currents and voltages are independent of the direction of motion. Thus, in FIG. 2, if there is no supply from the bridges 1, and the point 'e' is positive with respect to the other armature terminal, then the field direction corresponds to the direction of motion, and vice-versa.

Either condition, of armature current, or reversed armature voltage polarity, when there is field excitation, is used by the master controller to lock open the motor contactor MC and thus prevent a short circuit being presented to the motor. The brake contactor is at the same time locked closed.

When the point b in FIG. 3 has been reached by rheostatic braking, the field excitation is at a maximum and the armature current will start to fall as the speed falls. Braking effort would then start to decrease along the solid line b c. However, plugging, i.e. injection braking, can then be employed automatically by 'phasing-up' the bridges 1 under armature current control to maintain the armature current constant. This injected current is, of course in the same direction as the generated current, it contributes to the power dissipated in the braking resistor and maintains reverse traction at the full value attained at b down to zero speed. This is illustrated in FIG. 3 by the broken line portion b d.

In order to prevent the locomotive going into reverse (if the driver does not move the power handle to 'off') when the locomotive comes to rest, the master controller is arranged to detect a small value of armature voltage and to open the power circuit when this is reached, leaving the locomotive to come to rest on mechanical brakes.

Apart from the above use of rheostatic braking supplemented by injected braking in a normal braking operation it will also arise if the forward/reverse handle is operated during motion. A mechanical interlock on this handle prevents its operation while the power handle is 'on' but when in the 'off' position and coasting, the forward/reverse handle may be operated instead of, more properly, the brake handle. If the driver then demands power by operation of the power handle the reversing circuitry will operate the reversing switches 4 to accord with the new position of the forward/reverse handle. The field and brake contactors close as before for normal motoring except that the field is now set for motoring in a direction opposite to the coasting direction. The field is increased to a maximum or the limiting value and consequently armature e.m.f. is generated in the permitted direction of armature current. Armature current consequently flows and rheostatic braking occurs.

Once again, the presence of armature current, and/or reverse polarity of the armature voltage, together with field excitation, is used by the master controller to lock out the motor contactor MC and thus avoid any possibility of presenting a short circuit to the motor/generator. To minimise equipment damage, the brake contactor BC is also locked closed in this condition and limits the armature current.

When maximum excitation is reached the armature supply bridges 1 are 'phased-up' as before and current injection braking is combined with the rheostatic braking.

The invention is not, of course, restricted to circuits using thyristor bridges but may be used with any source having a low impedance 'freewheel' path, e.g. tapchanger/diode rectifier; diesel-generators, diesel-alternator-rectifiers, booster type vehicles and D.C. vehicles which may use chopper or other control.

It may be seen that the invention is equally applicable to D.C. motors which are series connected for motoring and separately excited for braking. There is however, the difference that in braking by operation of the reverse handle there will be no isolation of the field winding from the armature such as will occur following operation of the brake handle. Consequently, although the reversed series field is in a direction to promote generated armature current, the field flux will immediately collapse and no rheostatic braking will occur. Controlled plug braking is nevertheless available by phasing up the bridges 1 to a small extent to provide excitation and armature current, the relative directions then being appropriate for tractive braking. The motor contactor MC will again be locked open before the supply voltage is increased significantly.

It may also be seen that the invention is applicable to a separately excited arrangement in which the armature, instead of the field, is reversed for rheostatic and plug braking. The same criteria apply for operation of the motor contactor: if the armature voltage (outside the reversing switch) has normal motoring back e.m.f. polarity or is zero, or if the armature current is zero, when the power handle is 'on' and the field is excited, then it is safe to close the motor contactor and 'phase-up' the bridges 1. If the armature voltage has reverse polarity or there is armature current in these conditions then the motor contactor must be locked open.

Although the above arrangement has been described using feedback control of the armature current clearly manual control can be employed to various extents in accordance with conventional practice.

A subsidiary advantage provided by the field reversal system of the invention concerns the protection of the equipment against earth faults. An earth fault relay 18 is connected between earth and the lower side of the armatures in FIG. 2. Where there is more than one motor, i.e. as in FIG. 2 and these have series diodes 5 to prevent circulating currents, the diodes being situated between the armature and earth, then, if no field reversal is effected in braking, the generated e.m.f. will reverse bias the diode 5 and isolate the armature from the earth fault relay. Operation according to the invention automatically forward biases the diodes 5 during braking and ensures that the earth fault protection remains available.

I claim:

1. A dynamic braking system for a D.C. motor, including:
   (I) a unidirectional series circuit comprising
      (a) a D.C. motor armature,
      (b) a first controllable D.C. power source having a permanent low-impedance path therethrough, and
      (c) a brake resistor
   said system further including
   (II) switch means connected to said brake resistor for short-circuiting it prior to a motoring operation,
   (III) a field winding of said D.C. motor,
   (IV) a second controllable D.C. power source, to which said field winding is connected at least in a braking mode,
   (V) reversing means for reversing the relative direction of current flow in said armature and said field winding,
   (VI) control means for limiting operation of said reversing means to a condition of zero power output from said first D.C. power source, and
   (VII) means for detecting the presence of armature current when said field winding is energised following operation of said reversing means, said control means being connected to prevent closure of said switch means when said means for detecting armature current is activated.

2. A braking system according to claim 1, wherein said means for detecting armature current comprises a current detection device.

3. A braking system according to claim 1, wherein said means for detecting armature current comprises means responsive to the polarity of the armature voltage, said polarity being dependent, in the absence of power from said first D.C. power source, upon the direction of field excitation in relation to the direction of armature rotation.

4. A braking system according to claim 1 wherein said first D.C. power source comprises a controlled rectifier bridge circuit including uncontrolled rectifying elements providing a permanent low-impedance unidirectional path through the D.C. power source.

5. A braking system according to claim 1, wherein said second D.C. power source comprises a controlled rectifier bridge circuit.

6. A braking system according to claim 1, wherein said motor armature and said brake resistor constitute one arm of a plurality of similar arms connected in parallel, each of said arms further comprising a rectifying element to prevent current circulating between the arms.

7. A braking system according to claim 6, comprising an earth fault protection device connected between an earth terminal and terminals of said armatures remote from the respective brake resistors, said rectifying element being connected in each arm between the protection device and the armature so that in a breaking operation the rectifying elements are forward biased and isolation of the armatures from the protection device is prevented.

8. A braking system according to claim 1, wherein said D.C. motor is permanently separately excited.

9. A braking system according to claim 1, wherein said D.C. motor is series excited in a motoring mode and separately excited in a braking mode.

* * * * *